United States Patent
Laidler

(10) Patent No.: US 6,742,471 B2
(45) Date of Patent: Jun. 1, 2004

(54) INSTALLATION FOR REPELLING BIRDS

(76) Inventor: Walter A. Laidler, 13550-13A Avenue, Surrey (CA), V4A 1C4

( * ) Notice: Subject to any disclaimer, the term of this patent is extended or adjusted under 35 U.S.C. 154(b) by 0 days.

(21) Appl. No.: 10/341,270

(22) Filed: Jan. 14, 2003

(65) Prior Publication Data

US 2004/0016388 A1 Jan. 29, 2004

(30) Foreign Application Priority Data

Jul. 24, 2002 (CA) .............................................. 2394904

(51) Int. Cl.[7] .......................................... A01M 29/00
(52) U.S. Cl. ................................................. 116/22 A
(58) Field of Search ............................. 116/22 A; 43/1, 43/124; 52/101

(56) References Cited

U.S. PATENT DOCUMENTS

| | | | | | |
|---|---|---|---|---|---|
| 2,731,937 | A | * | 1/1956 | Rhodes | 116/87 |
| 3,799,105 | A | * | 3/1974 | Porter | 116/22 A |
| 4,074,653 | A | * | 2/1978 | Pember | 116/22 A |
| 4,109,605 | A | * | 8/1978 | Bachli | 116/22 A |
| 4,115,965 | A | | 9/1978 | White | |
| 4,598,660 | A | | 7/1986 | Konzak | |
| 5,092,088 | A | * | 3/1992 | Way | 52/101 |
| 5,286,142 | A | | 2/1994 | Hoyt et al. | |
| 5,918,404 | A | * | 7/1999 | Ohba | 43/1 |
| 5,956,880 | A | | 9/1999 | Sugimoto | |
| 6,003,471 | A | * | 12/1999 | Ohba | 119/713 |
| 6,351,908 | B1 | | 3/2002 | Thomas | |

FOREIGN PATENT DOCUMENTS

| | | | |
|---|---|---|---|
| DE | 1281741 | * | 10/1968 |
| EP | 0985345 | A1 | 3/2000 |
| GB | 199867 | | 7/1923 |

* cited by examiner

Primary Examiner—Diego Gutierrez
Assistant Examiner—R. Alexander Smith
(74) Attorney, Agent, or Firm—Fredrick Kalifman Inc.

(57) ABSTRACT

The installation comprises a drive incorporating a guy rope provided at each end with a swivel joint, a driven rotating element and a pair of driving pulleys, all secured to the guy rope. A pair of driven pulleys is opposed to the pair of driving pulleys. A pair of endless cables is tensioned between the driving and driven pulleys and each endless cable has an upper and lower paths. A pair of stretched guide ropes, essentially parallel to the pair of endless cables is used. Each one of the stretched guide ropes is perpendicularly disposed to the stretched drive guy rope and extends from the ends of the latter. At least a pair of carrying lines is perpendicularly disposed with respect to the pair of stretched guide ropes. An actuating assembly including a reversible electric motor is used.

4 Claims, 4 Drawing Sheets

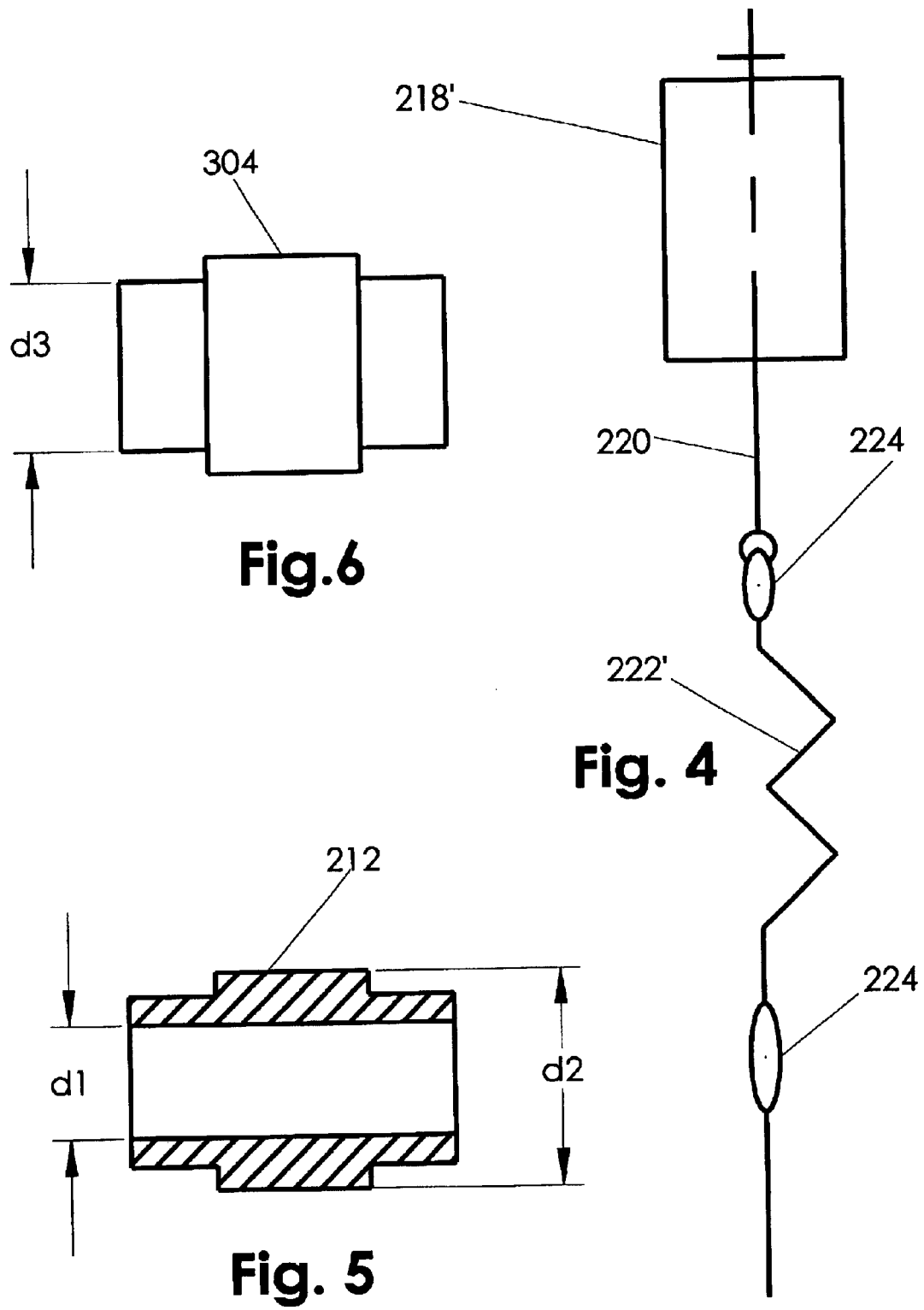

INSTALLATION FOR REPELLING BIRDS

BACKGROUND OF THE INVENTION

Field of the Invention

The present invention generally relates to apparatus for protecting horticultural and agricultural plots from small animals and, more particularly, to an installation for repelling birds. This installation causes bird flight from orchards, gardens, vineyards and the like, so that birds feeding habits are interrupted.

An activity of significant magnitude is the growing of fruit and berries. Trees growing fruit such as apples, pears, peaches, cherries and the like are presently grown in large orchards. Also, small fruit such as raspberries, strawberries, blueberries and the like are presently grown in bushes over extensive surfaces.

In the past, various types of devices and installations have been used in attempts to scare birds away from trees and bushes bearing fruit.

It has been proposed to utilize a loud noise so as to scare birds into flying from a crop field. Such a noise is usually provided by an air gun using a combustible gas. The air gun ignites the combustible gas at predetermined time intervals. However, due to the air gun's widespread use, the birds become accustomed to the noise and the scarring effect is gradually diminished. Also, such method of producing a loud noise is generally rejected by the surrounding neighborhood.

Also, it has been proposed to protect horticultural and agricultural plots against attack by bird flocks with nets or similar protective webbing. This approach is limited, since the cost of acquiring, installing and operating a system according to this method would be prohibitive, especially for large plots.

In view of the impracticability of the loud noise method and the substantial cost associated with the building and operating of the net covering system, farmers have generally turned to the tactic of scarring birds away by using repelling installations. Thus, German Patent No. 1,281,741, dated Oct. 31, 1968 and granted to Bachli for an "INSTALLATION FOR PROTECTING AGRICULTURAL CROPS FROM BIRDS" describes several embodiments wherein use is made of carrying lines provided with scarring features. In a first type of embodiments, each carrying line is engaged in a limited, alternative movement with respect to its initial position. In a second type of embodiment, carrying lines cover large surfaces and are actuated by endless cables across the whole length of a plot. Bachli's embodiments have important shortcomings. In the first type of embodiments the protected surface is limited, while in the second type of embodiment the use of pulleys, around which an endless cable is actuated by a reversible electric motor via a mechanical transmission, presents a major technical disadvantage. It is common knowledge, that any flexible transmission of power, such as flat and V-belts or chains can be used only for limited distances, while the surfaces protected from birds imply long distances. U.S. Pat. No. 4,109,605, dated August 29 and granted to Bachli for a "SCARECROW SYSTEM" discloses an installation using a main towline carrying deterrent devices. The main towline is supported by wire or rope-held pulleys, secured to movably poles attached to the soil, and is actuated by a drive assembly that imparts a reciprocating movement. A main disadvantage of this installation resides in the fact that the crop surface remains not protected, only corners and border surfaces being protected.

SUMMARY OF THE INVENTION

Following the foregoing situation, there is a need for an installation for repelling birds that overcomes the disadvantages of the prior art.

Therefore, an objective of the present invention is to develop a reliable and efficient installation.

Another objective of the present invention is to provide a well-engineered installation so that it is simple to assemble and operate, and comprises components that generally wear evenly.

Yet another objective of the present invention is to provide a relatively inexpensive installation.

The present invention is predicated on the conviction that the use of one line, stretched drive guy rope in the present installation solves the long distance transmission of mechanical power. Furthermore, the use of a pair of carrying lines, provided with scarring elements, one carrying line simultaneously traveling in a direction opposite to the other carrying line, greatly enhances the efficiency of the present installation.

Broadly describing, the present installation comprises a unilinear drive assembly incorporating a stretched drive guy rope provided at each end with a swivel joint, a driven rotating element and at least one driving pulley, the former and the latter being firmly secured to the stretched drive guy rope. At least one driven pulley is opposed to the driving pulley and has a centerline situated in a plan passing through the midsection of the latter. At least one endless cable is tensioned between the driving and driven pulleys and has an upper path and a lower path. A pair of stretched guide ropes, essentially parallel to the endless cable is used. Each one of the stretched guide ropes is perpendicularly disposed to the stretched drive guy rope and extends from the ends of the latter. At least one carrying line is perpendicularly disposed with respect to the pair of stretched guide ropes. One carrying lines is attached to the upper path, while another is attached to the lower path, each end of each carrying line being slidably engaged with an adjoining one of the pair of stretched guy guide ropes. An actuating assembly includes a reversible electric motor connected to a reduction gear drive that is provided with an output drive shaft. On the latter, a drive wheel is securely fastened and transmits, via a mechanical transmission, a torsional moment to the driven wheel. The endless cable is provided with devices for triggering a change of direction of the reversible motor. Those devices are attached to the upper and lower paths at opposite positions, adjacent the driven pulley and the driven pulley, and act when the upper and the lower path, alternatively, at an end of their traveling paths come close to the driving pulley.

In one aspect of this invention, the installation for repelling birds further comprises devices for tension adjusting, secured outwardly from each swivel joint and from both ends of each stretched guide ropes. The devices for tension adjusting are adapted to be attached to posts anchored to the ground.

In another aspect of this invention, the installation for repelling birds further comprises at least one tensioning spring secured inwardly from at least one of the swivel joints of the unilinear stretched drive guy rope and inwardly from at least one of the devices for tension adjusting of each of the stretched guide ropes.

BRIEF DESCRIPTION OF THE DRAWINGS

Although the characteristic features of this invention will be particularly pointed out in the claims, the invention itself and the manner in which it may be made and used, may be better understood by referring to the following description taken in connection with the accompanying drawings forming part hereof, wherein like reference numerals refer to like parts throughout the several views in which:

FIG. 4 illustrates, in larger scale, detail C of FIG. 1;

FIG. 5 illustrates a longitudinal cross-section of a hollow shaft used in first ball bearing assemblies; and FIG. 6 illustrates a front elevation view of a solid axle used in second ball bearing assemblies.

DESCRIPTION OF THE PREFERRED EMBODIMENTS

A horticultural plot or field, usually having a parallelogram view in plan and comprising rows of plants, bushes or trees, is protected by an installation for repelling birds 100.

Figure 1:
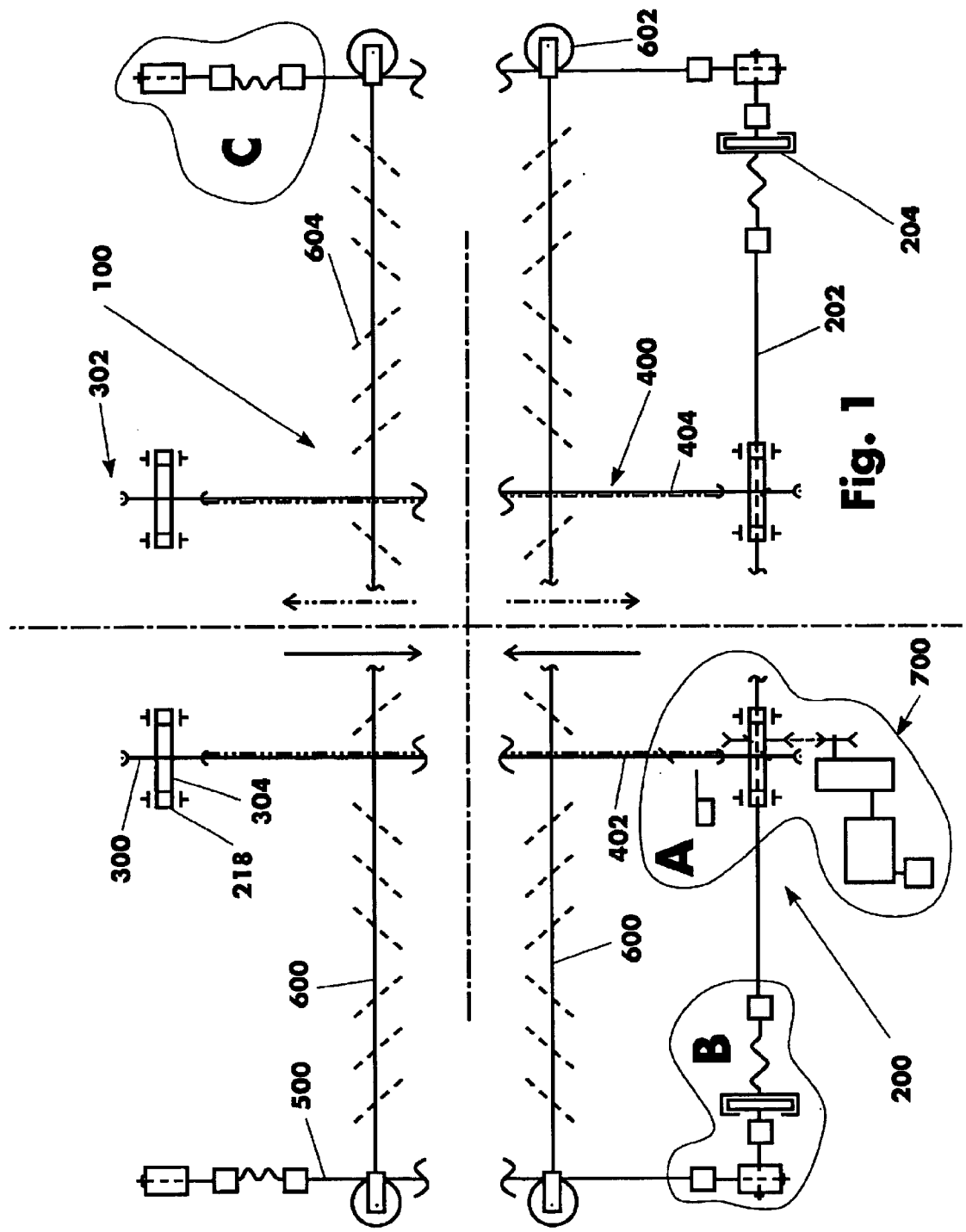
FIG. 1 illustrates a diagrammatic top view of the installation for repelling birds in accordance with the present invention.
Figure 2:
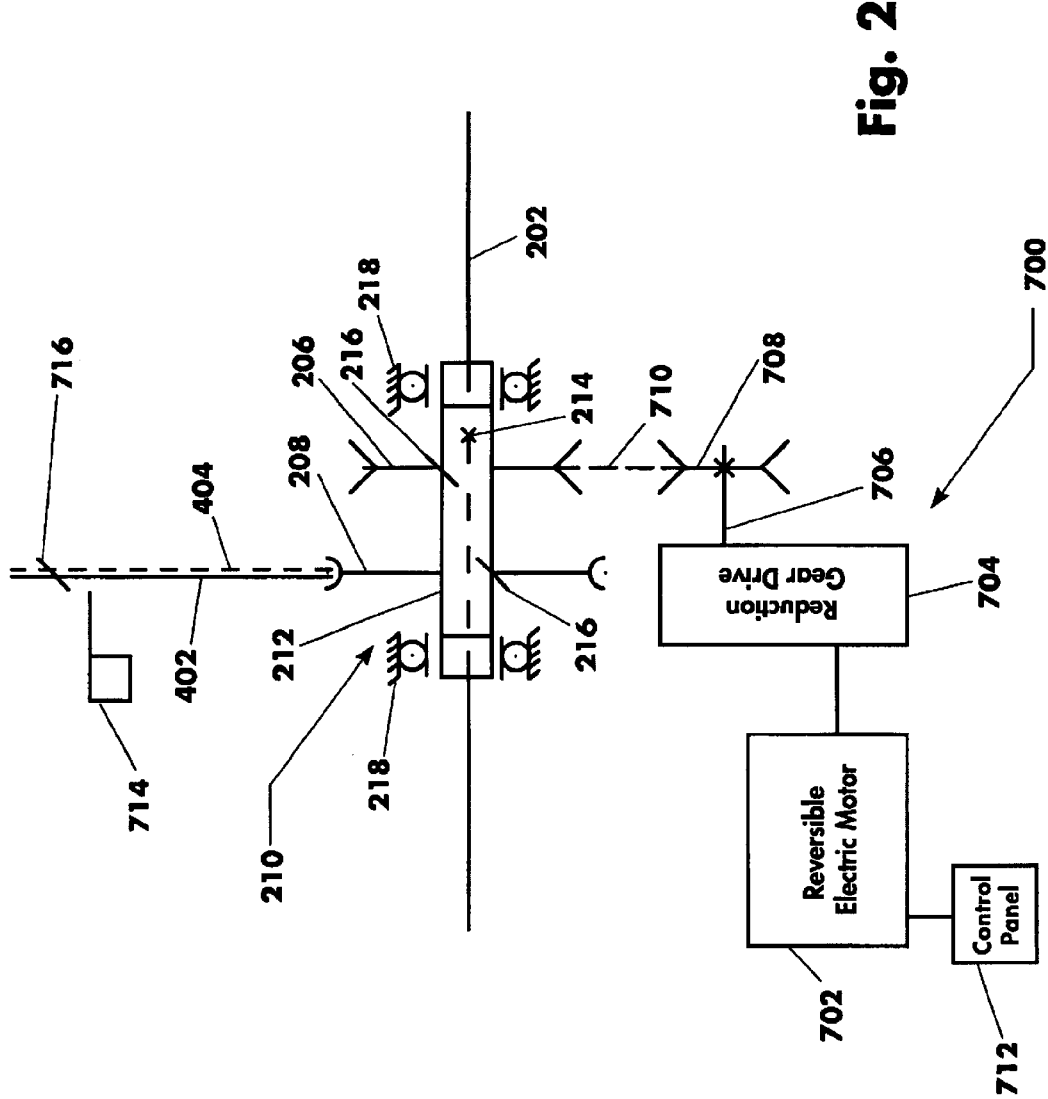
FIG. 2 illustrates, in larger scale, detail A of FIG. 1.
Figure 3:
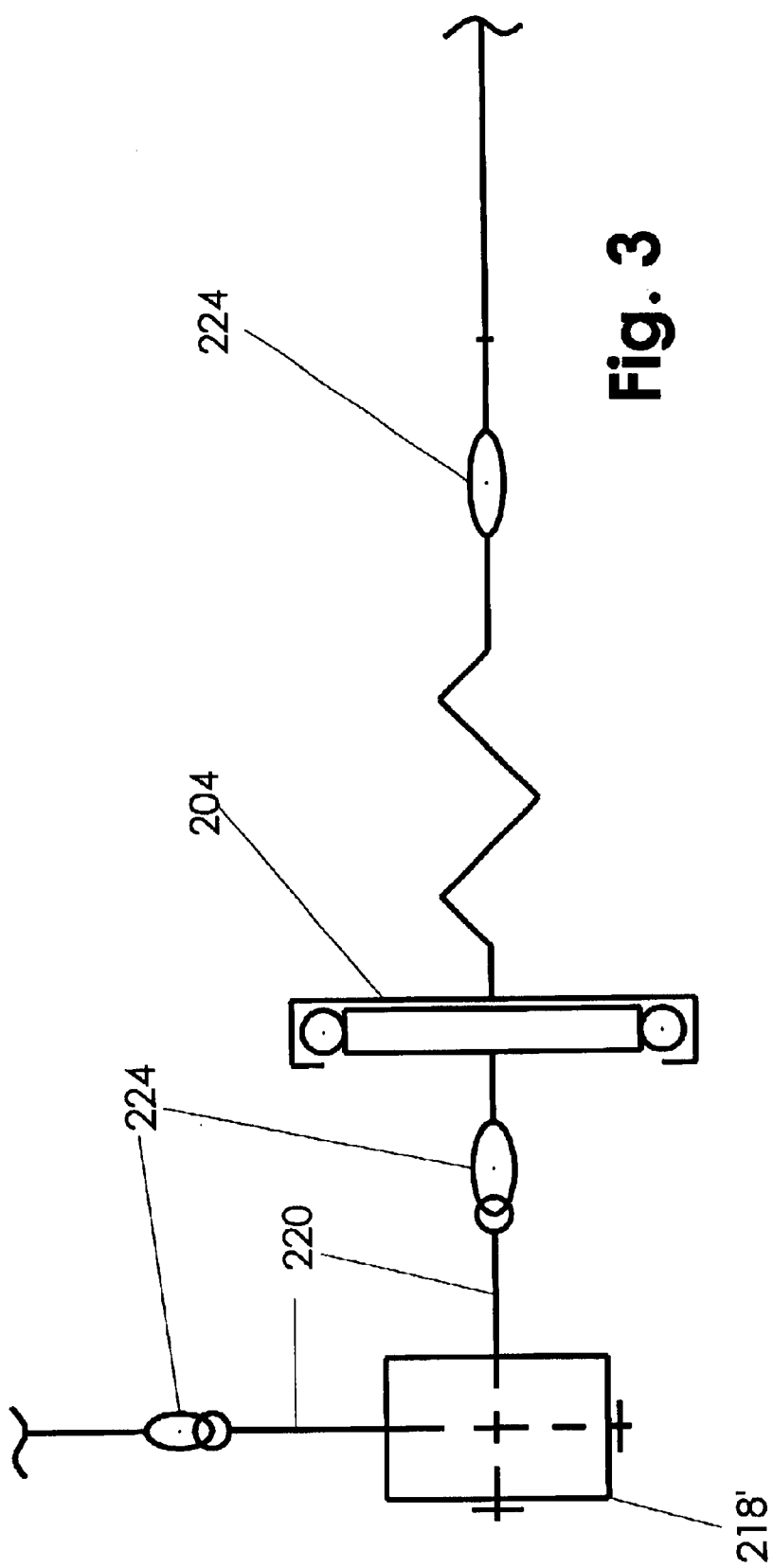
FIG. 3 illustrates, in larger scale, detail B of FIG. 1.

Installation for repelling birds 100, as shown in FIGS. 1 through 6, comprises essentially the following:

a unilinear drive assembly 200 incorporating a stretched drive guy rope 202, provided at each end with a swivel joint 204;

a V-belt driven pulley 206 and a pair of spaced driving pulleys 208, the former and the latter being firmly attached to stretched drive guy rope 202;

a pair of spaced driven pulleys 300, opposed to the pair of spaced driving pulleys 208, each spaced driving pulley 208 having a center line situated in a plane passing through a midsection of a spaced driven pulley 300;

a pair of endless clothes lines 400, each one being tensioned between a spaced driving pulley 208 and a spaced driven pulley 300 and each one having an upper path 402 and a lower path 404, the latter being shown in phantom or dash lines;

a pair of stretched guide guy ropes 500, essentially parallel to the pair of endless clothes lines 400, each guide guy rope 500 being perpendicularly disposed to stretched drive guy rope 202 and extending from the ends of the latter;

a pair of carrying lines 600, perpendicular to stretched, guide guy ropes 500, each end of a carrying line 600 being slidably engaged with a stretched guy guide rope 202; one carrying line 600 being fixed to upper paths 402, while another carrying line 600 being attached to lower paths 404 of the pair of the pair of endless clothes lines 400; and an actuating assembly 700 including a reversible electric motor 702 transmitting via a reduction gear drive 704, provided with an output drive shaft 706, on which a V-belt drive pulley 708 is securely fastened, and via a V-belt 710, a torsional moment from V-belt drive pulley 708 to V-belt driven pulley 206.

Preferably, during the operation of the installation for repelling birds 100, stretched drive guy rope 202 rotates alternatively in both directions causing the pair of endless clothes lines 400 to be engaged in a to and fro movement, respectively, one of the endless clothes lines 400—between a position adjacent to the pair of spaced driving pulleys 208 and a position located midway between the latter and the pair of spaced driven pulleys 300, the other endless clothes lines 400—between a postion adjacent to the pair of spaced driven pulley 300 opposite opposite and the above midway position. For example, if one carrying line 600 is attached, adjacent to the pair of spaced driving pulleys 208, to upper paths 402, the other carrying line 600 is attached, adjacent to the pair of spaced driven pulleys 300, to lower paths 404 of the pair of endless clothes lines 400, or vice versa. Thus, one carrying line 600 performs, alternatively, a linear motion in an opposite direction of the traveling of the other carrying line 600.

Describing now in detail, the installation for repelling birds 100 comprises unilinear drive assembly 200, which incorporates stretched drive guy rope 202 provided at each end with a swivel joint 204, V-belt driven pulley 206 and the pair of spaced driving pulleys 208 attached to stretched drive guy rope 202. A pair of first ball bearing assemblies 210 is used to support V-belt driven pulley 206 and the pair of spaced driving pulleys 208. More specifically, one first ball bearing assembly 210 supports V-belt driven pulley 206 and one spaced driving pulley 208, while the other first ball bearing assembly 210 supports only one spaced driving pulley 208. Each first ball bearing assembly 210 incorporates a hollow shaft 212 having an internal diameter $d_1$ so commensurate with a diameter of stretched drive guy rope 202, so that the latter can freely pass through the former. Hollow shaft 212 is defined as well by two external diameters: a large central diameter $d_2$ and a lesser large ends diameter $d_3$. A bolt 214 that penetrates hollow shaft 212 secures the latter to stretched drive guy rope 202. Hollow shaft 212 has a middle portion corresponding to larger central diameter $d_2$ to which, in one first ball bearing assembly 210, V-belt driven pulley 206 and one spaced driving pulley 208 are rigidly fastened by using conventional securing features 216. In the other first ball bearing assembly 210, to the middle portion of hollow shaft 212 only one spaced driving pulley 208 is mounted.

A post 218 anchored to the ground is used for supporting and attaching each first ball bearing assembly 210.

An eye bolt-nut assembly 220 is used to attach the ends of stretched guy drive rope 202 to posts 218'. Before the attachment to eye bolt-nut assembly 220, stretched guy drive rope 202 is provided with a swivel joint 204 and a helical tension spring 222. Practically, one helical tension spring 222 suffices for resiliently tensioning stretched guy drive rope 202. Guy grip dead ends 224 of known design, easily available on the market, are used to conveniently interconnect assembly eye bolt-nut assembly 220, swivel joint 204 and helical tension spring 222. The adjustment of the resilient tensioning of stretched guy drive rope 202 between posts 208' is achieved by means of eye bolt-nut assembly 220.

A pair of second ball bearing assemblies 302 is used for the pair of spaced driven pulleys 300, which are opposed to and collinear with the pair of spaced driving pulleys 208. The difference between second ball bearing second assemblies 302 and first ball bearing assemblies 210 resides in the fact that the former use a solid axle 304 instead of hollow shaft 212 used in the latter.

A post 218 anchored to the ground is used for supporting and attaching each second ball bearing assembly 302.

In each endless clothes line 400, usually a tension spiral spring (not shown) is intercalated. Each carrying line 600 terminates at its ends with a horizontal pulley 602 that engages stretched guy guide rope 500 from the exterior.

Both carrying lines 600 follow in general the layout of the field or plot and will avoid interference with the normal growth of the plants to be protected or with the harvesting or other machinery.

A multiplicity of birds scare devices 604 is arranged in intervals on each carrying line 600. Bird scare devices 604 may be in the form of strips of material, pennants, of reflecting material etc.

Each stretched guide guy rope 500 is attached to both ends, through a guy grip dead end 224, to an eye bolt-nut assembly 220. The latter is fastened to post 218'. A helical tension spring 222' is attached to guide guy rope 500, at one end, next to one eye bolt-nut assembly 220.

Actuating assembly 700, mentioned above, incorporates as well the following conventional components:

- a control panel 712 electrically connected to reversible electrical motor 702;
- a limiting switch 714 mounted proximately to one spaced driving pulley 208; adjacent actuating assembly 700;
- a triggering element 716 connected to one upper and one lower paths 402 and 404, respectively, in positions corresponding to the end of their traveling courses, when they alternatively reach one of the pair of spaced driving pulleys 208 adjacent actuating assembly 700. Thus, a contact is made with control panel 712 to stop reversible electrical motor 702 and change its direction of rotation.

Since the structure and the use in combination of the above components of actuating assembly 700 are common knowledge, a further explanation of the same appears to be unnecessary.

It is known that when wire rope remains in a fixed position (such as in cables for suspension bridges, anchoring posts or haulage) or where little bending is required, use is made of guy ropes.

For transmission of motion mainly in elevators, mine hoists, cranes, ski-lifts or other aerial conveyors, where flexibility over grooved pulleys and drums is required, standard flexible or extra flexible hoisting ropes are used. In these cases drums are always used for winding or unwinding flexible hoisting ropes. The latter, in comparison with guy ropes, comprise a flexible core, more strands and thinner wires. Consequently, their cost is significantly higher than that of guy ropes.

The transmission of power, using wire ropes around a driving and driven pulley, is not appropriate in general and especially for long distances. First, there is no wedging action of the wire rope in the groove of the pulley to provide an effective coefficient of friction for an efficient gripping. Second, the distance between the axes of driving and driven pulleys in similar is limited. For example, for flat belts $$L_{opt}=2(D+d),$$

where $L_{opt}$—optimal distance between the axes of a driving pulley D and a driven pulley d; It is suggested to limit the distance between driving and driven pulley to $L_{opt}$.

In chain transmissions, where gripping is fully obtained, the optimal distance between the axes of driving and driven sockets is $$A_{opt}=(30-50)p,$$

where $A_{opt}$—optimal distance and p—pitch of the chain.

It is suggested to limit the distance in chain transmissions ton $$A_{max}=80p.$$

As can be seen from the foregoing, the use of flexible transmissions, such as wire ropes or chains, for power transmission between pulleys or sprockets is limited to relative short distances. Installation for repelling birds 100 is intended to serve large surfaces defined by long distances.

After substantial experimentation and testing, the inventor has discovered that by using an one line stretched guy rope, provided at both ends with a swivel joint, one can advantageously receive a significant, alternative torsional moment from a power source, such as an electrical motor, and further transmit that moment at long distances.

As required, detailed embodiments of the present invention are disclosed herein; however, it is to be understood that the disclosed embodiments are merely exemplary of the invention, which may be embodied in various forms. Therefore, specific structural and functional details disclosed therein are not to be interpreted as limiting, but merely as a basis for the claims and as a representative basis for teaching one skilled in the art to variously employ the present invention in virtually any appropriately detailed structure. For example, alternatively to the above embodiment, other embodiments using more or less endless clothes lines 400, carrying lines 600 and/or helical tension springs 222 and 222' are contemplated.

An alternative variant to the above embodiment contemplates the use of a pair of stretched guide guy ropes 500 placed between the pair of endless clothes lines 400.

It is also envisaged the possibility of using only one carrying line 600 travelling in both directions between driving and driven pulleys 208 and 300 and, respectively, vice versa.

The embodiments of the invention in which an exclusive property or privilege is claimed are defined as follows:

1. Installation for repelling birds comprising, in combination, a unilinear drive assembly incorporating a stretched drive guy rope provided at each end with a swivel joint;

a driven rotating element and at least one driving pulley, the former and the latter being firmly secured to said stretched drive guy rope;

at least one driven pulley, opposed to said at least one driving pulley and having a center line situated in a plan passing through the midsection of the latter;

at least one endless cable, tensioned between said at least one driving pulley and said at least one driven pulley, said at least one endless cable having an upper path and a lower path;

a pair of stretched guide ropes, essentially parallel to said at least one endless cable, each one of said pair of stretched guide ropes being in general perpendicularly disposed to said stretched drive guy rope and extending from the ends of the latter;

at least one carrying line, perpendicularly disposed with respect to said pair of stretched guide ropes and attached to said at least one endless cable; and an actuating assembly including a reversible electric motor transmitting via a reduction gear drive, provided with an output drive shaft, on which a drive wheel is securely fastened, and via a mechanical transmission, a torsional moment from said drive wheel to said driven wheel; and a triggering element for changing direction of said reversible motor, said triggering element being attached to said at least one endless cable initiates a change of direction of said reversible motor when it reaches a position close to said one driving pulley.

2. Installation for repelling birds, as defined in claim 1, wherein said at least one carrying line is a pair of carrying lines perpendicularly disposed with respect to said pair of stretched guide ropes, one of said pair of carrying lines being attached to said upper path, the other of said pair of carrying lines being attached to said lower path, each end of said pair of carrying lines being slidably engaged with an adjoining one of said pair of stretched guide ropes.

3. Installation for repelling birds, as defined in claim 1 or claim 2, further comprising means for tension adjusting, secured outwardly from each said swivel joint and from both ends of each of said stretched guide ropes, said means for tension adjusting being adapted to be attached to posts anchored to the ground.

4. Installation for repelling birds, as defined in claim 1, further comprising spring means for tensioning, secured inwardly from at least one of said swivel joints of said stretched drive guy rope and inwardly from at least one of said means for tension adjusting of each of said stretched guide ropes.

* * * * *